Aug. 3, 1937.  L. A. KELLOGG  2,088,860

DIAL CONSTRUCTION

Filed March 1, 1937

INVENTOR.
LEONARD A. KELLOGG.
BY Allen & Allen
ATTORNEYS.

Patented Aug. 3, 1937

2,088,860

UNITED STATES PATENT OFFICE 2,088,860

DIAL CONSTRUCTION

Leonard A. Kellogg, Cincinnati, Ohio, assignor to The Crosley Radio Corporation, Cincinnati, Ohio, a corporation of Ohio Application March 1, 1937, Serial No. 128,322

15 Claims. (Cl. 116—124.1)

My invention has to do with the provision of novel and attractive decorative effects in connection with dial assemblies, and while its utility is not so restricted, as will be obvious, I shall describe my invention in an exemplary embodiment which is a dial assembly for radio receiving sets.

My fundamental objects are the provision of a dial which, while easily read, nevertheless has a distinctive, interesting, and beautiful appearance. The more specific objects of my invention will be set forth hereinafter or will be apparent to one skilled in the art upon reading these specifications. Reference to the drawing is now made for a better understanding of the exemplary embodiment of my invention referred to, wherein:—

Figure 1:
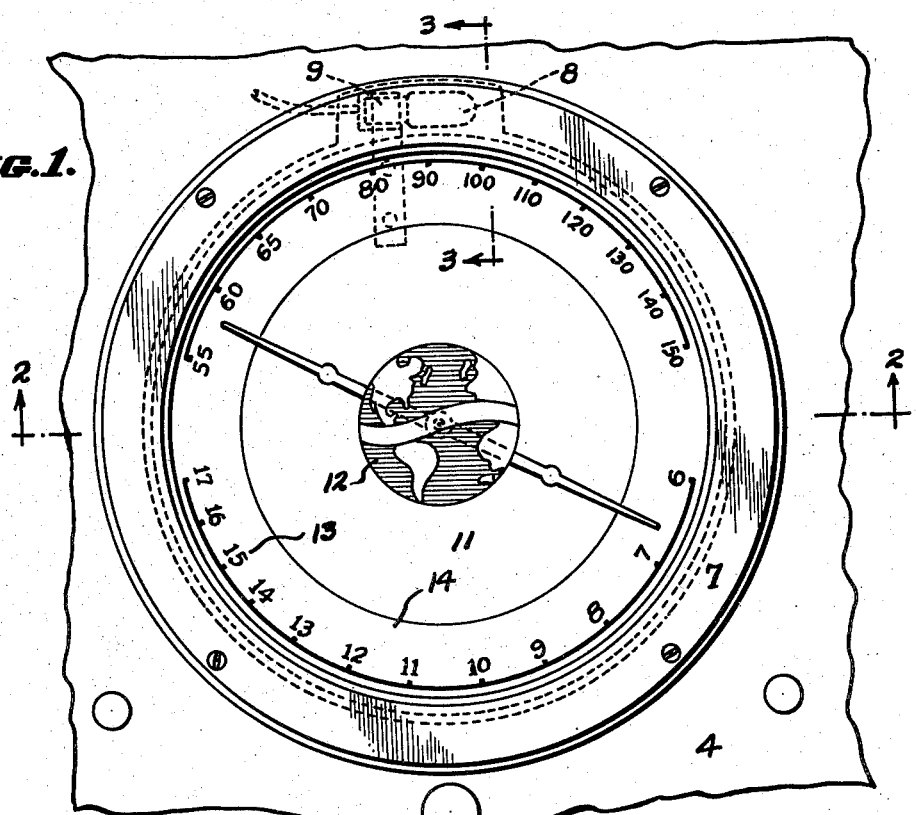
Figure 1 is a plan view of the dial assembly.
Figure 2:
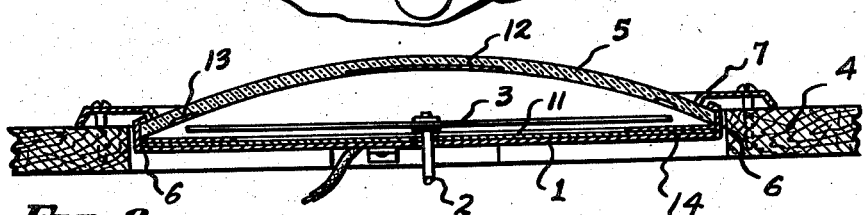
Fig. 2 is a sectional view thereof taken along the lines 2—2 of Fig. 1.
Figure 3:
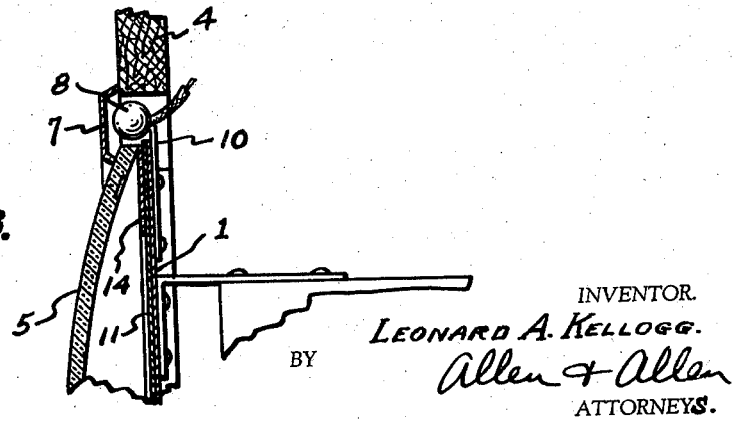
Fig. 3 is a partial sectional view on an enlarged scale taken along the lines 3—3 of Fig. 1.

In the practice of my invention I provide a dial in which there is a main panel over which the hand or hands of the indicating device are located. There is also a cover glass above the hand or pointer and interspaced from the panel. The cover glass is preferably illuminated by a source of light so located that the light is transmitted edgewise through the glass, giving what is frequently referred to as indirect illumination.

The main panel is made of some reflective substance as hereinafter more particularly set forth; and the cover glass bears a decorative design, or utilitarian indicia, or both as desired. When the design or indicia is illuminated as aforesaid, the observer not only sees this directly, but also sees its reflection in the main panel. Thus there is created a pleasing effect of variable character depending upon the angle from which the dial construction is viewed.

It is within the purview of my invention to locate the scale for the hands or pointer either on the main panel or on the cover glass. Where the scale is located on the cover glass it is not desirable that the main panel be reflective behind the scale, since this would create a double image which might be confusing. The main panel may therefore be so constructed that it is non-reflective behind the scale but reflective elsewhere; or, since the scale is of course located substantially peripherally of the cover glass, a ring of non-reflective substance may conveniently be placed over the main panel and beneath the scale.

In the drawing, I refers to a dial support, generally a plate of metal affixed to the chassis of a radio set. 2 represents the shaft, or an extension of the shaft of a condenser or condenser drive portion to which the pointer 3 is attached as is usual. The support will be so fastened to the chassis, or otherwise positioned, that when the radio set is placed in a cabinet 4, the dial assembly will lie in or opposite the perforation in the radio cabinet provided for this purpose.

A cover glass is represented at 5. Preferably it is of arcuate cross section or convex outer shape, though if desired, a planar cover glass, properly interspaced from the main panel may be employed. The glass may be fastened to the support 1 as by means 6; or it may be mounted to the radio cabinet if preferred. In any case there will be the usual bezel 7 fastened to the cabinet to finish off the glass. The glass may, if desired, be mounted in connection with the bezel by means shown in the copending application of Fred Johnston, Serial No. 117,805, filed December 28, 1936, and entitled Mounting devices, the mounting flange being cut away where necessary to permit sidewise illumination of the glass.

The illumination may be had by means of a bulb 8, in a suitable socket 9. The socket may be supported in any suitable way. I have shown it on a bracket 10 affixed to the support 1. The bulb is so located as to illuminate the glass edgewise.

The support 1 is surmounted by a main panel 11. This panel will, as indicated, be made of a reflective substance. It may be a glass mirror or a sheet of highly polished, and preferably non-tarnishing metal, or the like; but it is not necessary and may not be preferred that the main panel be as highly reflective as the ordinary mirror, and thus if a metal panel is employed, it may have a slightly matte surface. Also cardboard covered with metal foil or with some layer of fairly highly reflective substance may be employed. My invention contemplates all of these variants; and by their means considerable variation in the nature of the effect produced may be attained. Thus the reflected image may be a very sharp image or it may be a diffused image produced by a less perfectly reflecting medium. Also the reflecting medium may have a color of its own, if desired.

The various indicia on the glass may be merely superimposed upon the glass surface; but it is preferable to provide the indicia by etching the glass surface with or without subsequent coloring of the etched portions. I have shown at 12 an exemplary ornamental device in the center of the cover glass 5 and have indicated at 13 scale markings, preferably formed in the glass in the same way.

I have explained how the observer sees not only the indicia such as 12, by the indirect illumination aforesaid, but also an image of the indicia reflected upon the surface 11. I have explained also that in the case of the scale markings it is not desirable to see a reflected image, since this might cause confusion. Therefore, I prefer to provide means for preventing the formation of a secondary or reflected image of the scale markings. To this end I have shown an annular member 14 the center portion of which is cut away, as shown, and which is preferably so positioned as to overlie the reflective material 11 peripherally and to underlie the scale markings on the cover glass. In practice, I make this annular piece of a dark colored or black paper or cardboard. It not only prevents the formation of a reflected image of the scale markings, but also cooperates with the reflective panel in giving a curious effect, namely the effect of looking at the reflective panel through a tube or cylinder of considerable length, the reflective image enhancing the apparent distance between the reflective surface 11 and the cover glass.

It is, however, within the scope of my invention, instead of using the member 14, to render the peripheral edges of the panel 11 non-reflective in any way desired. Also when using a member such as 14, I may print the scale indicia thereon instead of putting these indicia on the cover glass.

It is also within the scope of my invention to cause the indicia to be colored differently upon opposite sides, whereby the reflected image may be caused to have a different color from the color of the indicia as viewed direct.

Modifications may be made in my invention without departing from the spirit of it.

Having thus described my invention, what I claim as new and desire to secure by Letters Patent, is:—

1. In combination in an indicating device, a reflective panel and a transparent covering member, the indicating means of the device being located therebetween, and indicia on said transparent covering member visible both directly and as a reflected image in said reflective panel.

2. In combination in an indicating device, a reflective panel and a transparent covering member, the indicating means of the device being located therebetween, indicia on said transparent covering member visible both directly and as a reflected image in said reflective panel, and means for illuminating said indicia by light passing edgewise through said transparent covering means.

3. In combination in an indicating device, a reflective panel and a transparent covering member, the indicating means of the device being located therebetween, indicia on said transparent covering member visible both directly and as a reflected image in said reflective panel, said indicia comprising arbitrary or informative indicia and a scale marking, and means for preventing the formation of a reflected image of said scale marking.

4. In combination in an indicating device, a reflective panel and a transparent covering member, the indicating means of the device being located therebetween, indicia on said transparent covering means visible both directly and as a reflected image in said reflective panel, said indicia comprising both arbitrary or informative indicia and a scale marking, and means for preventing the formation of a reflected image of said scale marking, said means comprising means for rendering a peripheral portion of said reflective panel non-reflective.

5. In combination in an indicating device, a reflective panel and a transparent covering member, the indicating means of the device being located therebetween, indicia on said transparent covering member visible both directly and as a reflected image in said reflective panel, said indicia comprising both arbitrary or informative indicia and a scale marking, and means for preventing the formation of a reflected image of said scale marking, said means comprising an annular member of non-reflective character peripherally underlying the edges of said reflective panel.

6. In combination in an indicating device, a reflective panel and a transparent covering member, the indicating means of the device being located therebetween, indicia on said transparent covering means visible both directly and as a reflected image in said reflective panel, said indicia comprising both arbitrary or informative indicia and a scale marking, means for preventing the formation of a reflected image of said scale marking, said means comprising means for rendering a peripheral portion of said reflective panel non-reflective, and means for illuminating said indicia by light passing edgewise through said transparent covering means.

7. In combination in an indicating device, a reflective panel and a transparent covering member, the indicating means of the device being located therebetween, indicia on said transparent covering means visible both directly and as a reflected image in said reflective panel, said indicia comprising both arbitrary or informative indicia and a scale marking, and means for preventing the formation of a reflected image of said scale marking, said means comprising an annular member of non-reflective character peripherally underlying the edges of said reflective panel, said annular member being dark in color, whereby an effect of depth is given to the combination.

8. In combination, supporting means and an underlying reflective means, said means being perforated for the passage of an indicating shaft, an indicator on said shaft overlying said reflective means and a cover glass overlying said indicating means, indicia on said cover glass and an illuminating device located edgewise of said cover glass so as to illuminate said indicia by indirect light.

9. In combination, supporting means and an underlying reflective means, said means being perforated for the passage of an indicating shaft, an indicator on said shaft overlying said reflective means and a cover glass overlying said indicating means, indicia on said cover glass and an illuminating device located edgewise of said cover glass so as to illuminate said indicia by indirect light, said indicia being etched in said cover glass.

10. In combination, supporting means and an underlying reflective means, said means being perforated for the passage of an indicating shaft, an indicator on said shaft overlying said reflective means and a cover glass overlying said indicating means, indicia on said cover glass, an illuminating device located edgewise of said cover glass so as to illuminate said indicia by indirect light, and a non-reflecting annular member overlying the peripheral portions of said reflective panel.

11. In combination in an indicating device, a reflective panel and a transparent covering member, indicia on said transparent covering member visible both directly and as a reflected image in said reflective panel, said indicia comprising arbitrary or informative indicia and a scale marking, and means for preventing the formation of a reflected image of said scale marking.

12. In combination in an indicating device, a reflective panel and a transparent covering member, indicia on said transparent covering member visible both directly and as a reflected image in said reflective panel, said indicia comprising arbitrary or informative indicia and a scale marking, and means for preventing the formation of a reflected image of said scale marking, said means comprising means for rendering a peripheral portion of said reflective panel non-reflective.

13. In combination in an indicating device, a reflective panel and a transparent covering member, indicia on said transparent covering member visible both directly and as a reflected image in said reflective panel, said indicia comprising arbitrary or informative indicia and a scale marking, and means for preventing the formation of a reflected image of said scale marking, said means comprising an annular member of non-reflective character peripherally underlying the edges of said reflective panel.

14. In combination in an indicating device, a reflective panel and a transparent covering member, indicia on said transparent covering member visible both directly and as a reflected image in said reflective panel, said indicia comprising arbitrary or informative indicia and a scale marking, and means for preventing the formation of a reflected image of said scale marking, said means comprising means for rendering a peripheral portion of said reflective panel non-reflective, and means for illuminating said indicia by light passing edgewise through said transparent covering means.

15. In combination in an indicating device, a reflective panel and a transparent covering member, indicia on said transparent covering member visible both directly and as a reflected image in said reflective panel, said indicia comprising arbitrary or informative indicia and a scale marking, and means for preventing the formation of a reflected image of said scale marking, said means comprising an annular member of non-reflective character peripherally underlying the edges of said reflective panel, said annular member being dark in color, whereby an effect of depth is given to the combination.

LEONARD A. KELLOGG.